United States Patent
Chang et al.

(10) Patent No.: US 11,536,960 B2
(45) Date of Patent: Dec. 27, 2022

(54) HEAD UP DISPLAY SYSTEMS INCLUDING HOLOGRAM REPLICATOR

(71) Applicants: GM GLOBAL TECHNOLOGY OPERATIONS LLC, Detroit, MI (US); Envisics Ltd., Milton Keynes (GB)

(72) Inventors: Kai-Han Chang, Madison Heights, MI (US); Thomas A. Seder, Fraser, MI (US); Jamieson Leigh Christmas, Milton Keynes (GB)

(73) Assignees: GM GLOBAL TECHNOLOGY OPERATIONS LLC, Detroit, MI (US); Envisics Ltd.

( * ) Notice: Subject to any disclaimer, the term of this patent is extended or adjusted under 35 U.S.C. 154(b) by 464 days.

(21) Appl. No.: 16/531,744

(22) Filed: Aug. 5, 2019

(65) Prior Publication Data

US 2021/0041695 A1 Feb. 11, 2021

(51) Int. Cl.
| | |
|---|---|
| *G02B 27/01* | (2006.01) |
| *G02B 27/00* | (2006.01) |
| *G03H 1/22* | (2006.01) |
| *G02B 5/20* | (2006.01) |

(52) U.S. Cl.
CPC ..... *G02B 27/0103* (2013.01); *G02B 27/0081* (2013.01); *G03H 1/2205* (2013.01); *G03H 1/2294* (2013.01); *G02B 5/205* (2013.01)

(58) Field of Classification Search
CPC ............ G02B 27/0103; G02B 27/0081; G02B 5/205; G02B 2027/0118; G02B 27/0101; G02B 2027/0105; G02B 2027/0196; G03H 1/2205; G03H 1/2294; G03H 1/30; G03H 2001/2236; G03H 2001/2239; G03H 2001/306; G03H 2223/16; G03H 2223/24
See application file for complete search history.

(56) References Cited

U.S. PATENT DOCUMENTS

| | | | |
|---|---|---|---|
| 4,035,070 | A | 7/1977 | Hammond |
| 9,715,067 | B1 | 7/2017 | Brown et al. |
| 2012/0002256 | A1 | 1/2012 | Lacoste et al. |
| 2016/0377865 | A1* | 12/2016 | Alexander ............. G02B 26/10 345/8 |
| 2017/0075119 | A1 | 3/2017 | Schultz et al. |

OTHER PUBLICATIONS

U.S. Appl. No. 16/549,606, filed Aug. 23, 2019, Chang et al.
U.S. Appl. No. 16/363,536, filed Mar. 25, 2019, Chang et al.
U.S. Appl. No. 16/373,056, filed Apr. 2, 2019, Chang et al.
U.S. Appl. No. 16/379,439, filed Apr. 9, 2019, Chang et al.
U.S. Appl. No. 16/418,574, filed May 21, 2019, Chang et al.

* cited by examiner

*Primary Examiner* — Kimberly N. Kakalec (57) ABSTRACT

A head up display (HUD) system includes: one or more light sources and one or more phase modulators configured to generate and output a hologram; and a replicator configured to receive the hologram, to generate N replications of the hologram from the hologram, and to output the N replications of the hologram, where N is an integer greater than or equal to 2.

13 Claims, 7 Drawing Sheets

HEAD UP DISPLAY SYSTEMS INCLUDING HOLOGRAM REPLICATOR

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to display systems and methods for vehicles and more particularly to head up display systems of vehicles.

A driver of a vehicle traditionally views surroundings of a vehicle through windows, wind shields, and other glass of the vehicle. The driver may control vehicle acceleration, deceleration, and steering based on the driver's visual observation of the surroundings of the vehicle.

A vehicle may include one or more displays that display various information. For example, some vehicles include an infotainment system that includes a display that displays various infotainment and other vehicle information. A vehicle may also include a head up display (HUD) that displays information by forming a virtual image at a certain distance with reflection of a windshield. For example, the HUD may display a vehicle speed and other vehicle information.

SUMMARY

In a feature, a head up display (HUD) system includes: one or more light sources and one or more phase modulators configured to generate and output a hologram; and a replicator configured to receive the hologram, to generate N replications of the hologram from the hologram, and to output the N replications of the hologram, where N is an integer greater than or equal to 2.

In further features, the replicator includes: a transmissive element configured to receive the hologram and to output the N replications of the hologram; and a reflective element configured to reflect light toward the transmissive element; and a transparent element disposed between the transmissive element and the reflective element.

In further features, the transmissive element includes N different transmittances at N different locations and 100 percent transmittance at a location where the hologram is received by the transmissive element.

In further features, the transmissive element includes one or more neutral density filters configured to provide the N different transmittances at the N different locations.

In further features, the transmissive element includes one or more dielectric layers configured to provide the N different transmittances at the N different locations.

In further features, the transmissive element includes metallic nanowires configured to provide the N different transmittances at the N different locations.

In further features, the transmissive element includes metallic nanoparticles configured to provide the N different transmittances at the N different locations.

In further features, the transmissive element includes a refractive index mismatched interface configured to provide the N different transmittances at the N different locations.

In further features, the refractive index mismatched interface includes a photopolymer having controlled degree of polymerization.

In further features, the transmissive element includes: a first region where a first one of the N replications of the hologram is output; and a second region where a second one of the N replications of the hologram is output.

In further features, the transmissive element includes: a first predetermined transmission in the first region; and a second predetermined transmission in the second region, where the second predetermined transmission is greater than the first predetermined transmission.

In further features, the transmissive element further includes: a third region where a third one of the N replications of the hologram is output; and a third predetermined transmission in the third region, where the third predetermined transmission is greater than the second predetermined transmission.

In further features, the reflective element has a reflectivity of 100 percent.

In further features, the transparent element includes at least one of: glass; and a transparent plastic.

In further features, the replicator is configured to generate and output the N replications of the hologram such that each of the N replications of the hologram has the same intensity.

In further features, the N replications of the hologram do not overlap each other.

In further features, the replicator is configured to output the N replications of the hologram onto a substrate.

In further features, the substrate includes a windshield of a vehicle.

In a feature, a replicator for a head up display (HUD) system includes: a transmissive element configured to receive a hologram and to output N replications of the hologram, where N is an integer greater than or equal to 2; a reflective element configured to reflect light toward the transmissive element; and a transparent element disposed between the transmissive element and the reflective element.

In a feature, a head up display (HUD) system of a vehicle includes: a HUD control module configured to generate signals based on vehicle data, where the vehicle data includes at least one present operating parameter of the vehicle; one or more light sources and one or more phase modulators configured to generate and output a hologram based on the signals; a replicator including: a transmissive element configured to receive the hologram and to output N replications of the hologram onto a windshield of the vehicle, where N is an integer greater than or equal to 3, and where the N replications of the hologram do not overlap each other; a reflective element configured to reflect light toward the transmissive element; and a transparent element disposed between the transmissive element and the reflective element.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle may also include a holographic head up display (HUD) that includes a phase modulator and a coherent or partially coherent light source. The phase hologram is encoded on a phase modulator. A coherent or partially coherent light source illuminates the phase modulator with encoded phase hologram and is diffracted. The diffracted light reflects by a windshield of the vehicle and forms a real image on a driver's retina. Without replicating or steering the phase hologram, only the single hologram will present, and the HUD system may have a relatively small eye box/exit pupil (viewing area).

According to the present application, a replicator replicates the hologram, and outputs N identical holograms. Providing N identical holograms increases the size of the eye box/exit pupil of the HUD system. The N identical holograms do not overlap each other. A gap between each of the N identical holograms is greater than or equal to zero and less than or equal to a predetermined minimum diameter of human pupils (e.g., 2 millimeters). This ensures continuity of the virtual images while the viewer's eyes are moving.

Figure 1:
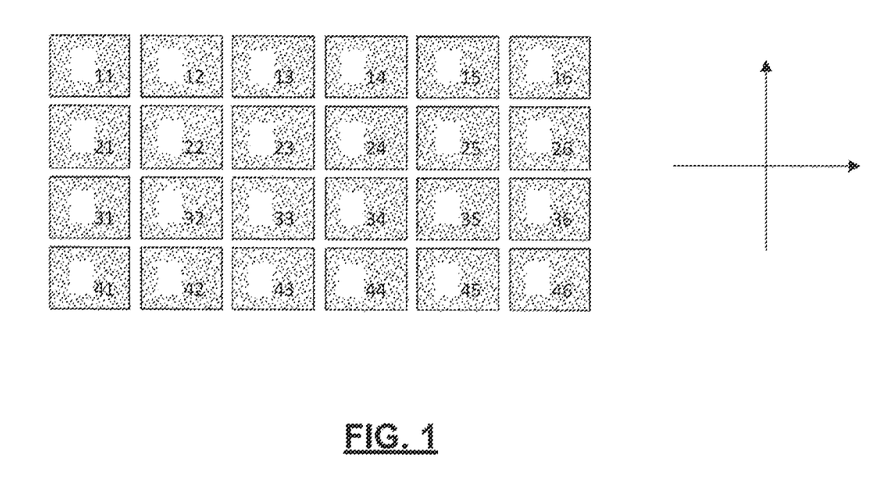
FIG. 1 is an example of a hologram being replicated in two directions (dimensions)

FIG. 1 is an example of a hologram being replicated in two directions (dimensions), a y direction and a z direction. Replicating the hologram enlarges the eye box. In the example of FIG. 1, one hologram is replicated (identically) 24 times. As discussed further below, the present application involves use of one or more replicators to replicate a hologram in one or more different directions. Replicating the FIG. 2 includes an example perspective view from a driver seat of a vehicle 100. The vehicle 100 includes a windshield 104 located in a front opening of the vehicle 100. Passengers within a passenger cabin 108 of the vehicle 100 can look through the windshield 104 to see in front of the vehicle 100. While the example of a land-based vehicle is described, the present application is also applicable to air-based vehicles (e.g., airplanes, helicopters, etc.) and water-based vehicles (e.g., boats, etc.). Also, while the example of a vehicle is provided, the present application is also applicable to non-vehicle implementations.

Figure 2:
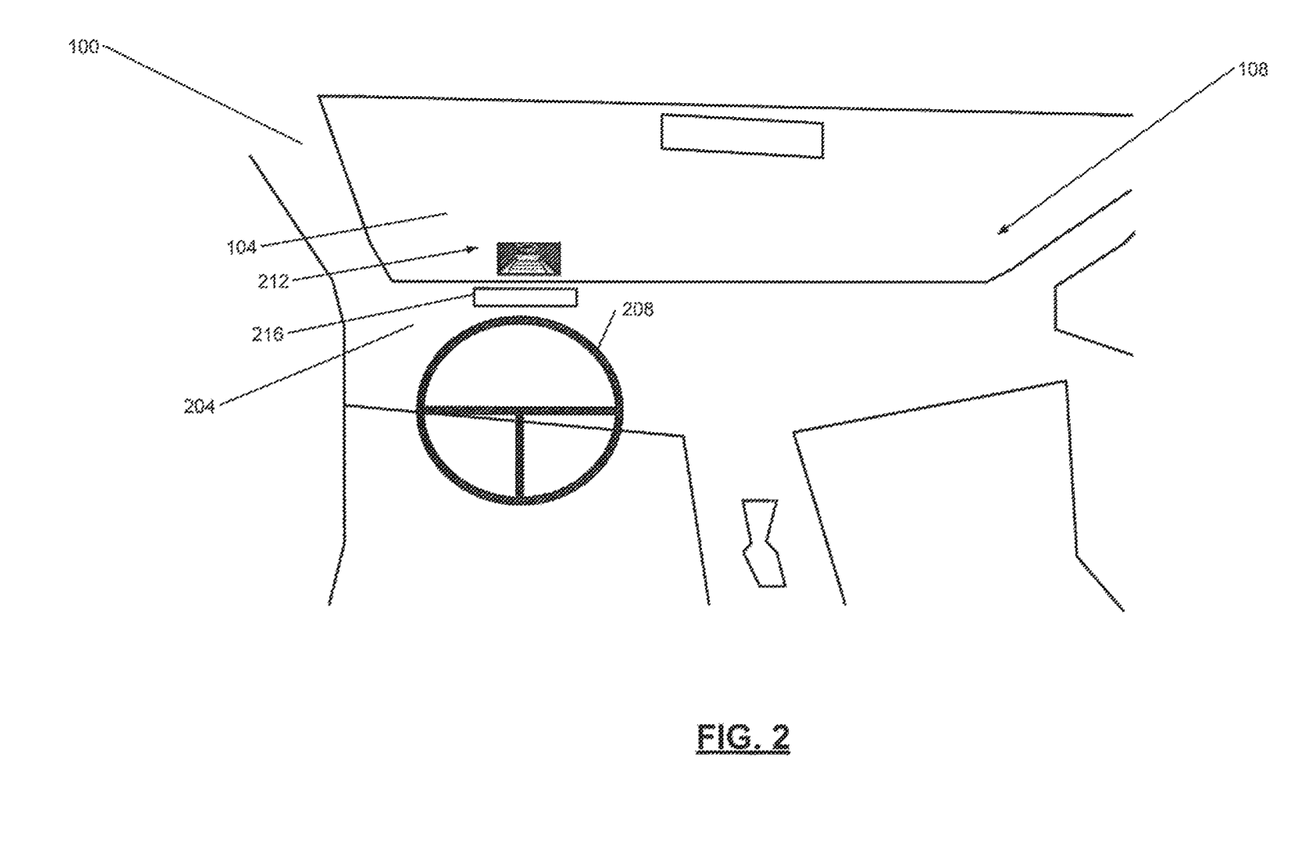
FIG. 2 is an example perspective view from of a driver seat within a passenger cabin of a vehicle.

As shown in FIG. 2, the windshield 104 is visually located above a dashboard 204 of the vehicle 100. The vehicle 100 may include a steering wheel 208. The vehicle 100 may be an autonomous vehicle, a semi-autonomous vehicle, or a non-autonomous vehicle.

A head up display (HUD) system 300 projects a hologram 212 onto a portion of the windshield 104 through an aperture 216 in the dashboard 204. The hologram 212 includes various vehicle information, such as a present speed of the vehicle 100, a present gear of a transmission of the vehicle 100, an engine speed, a directional heading of the vehicle 100, present infotainment system settings, and/or other vehicle information. The hologram 212 presents data to the driver of the vehicle without the driver having to look away from objects in front of the vehicle. As discussed further below, the hologram 212 includes replicated instances of one hologram.

Figure 3:
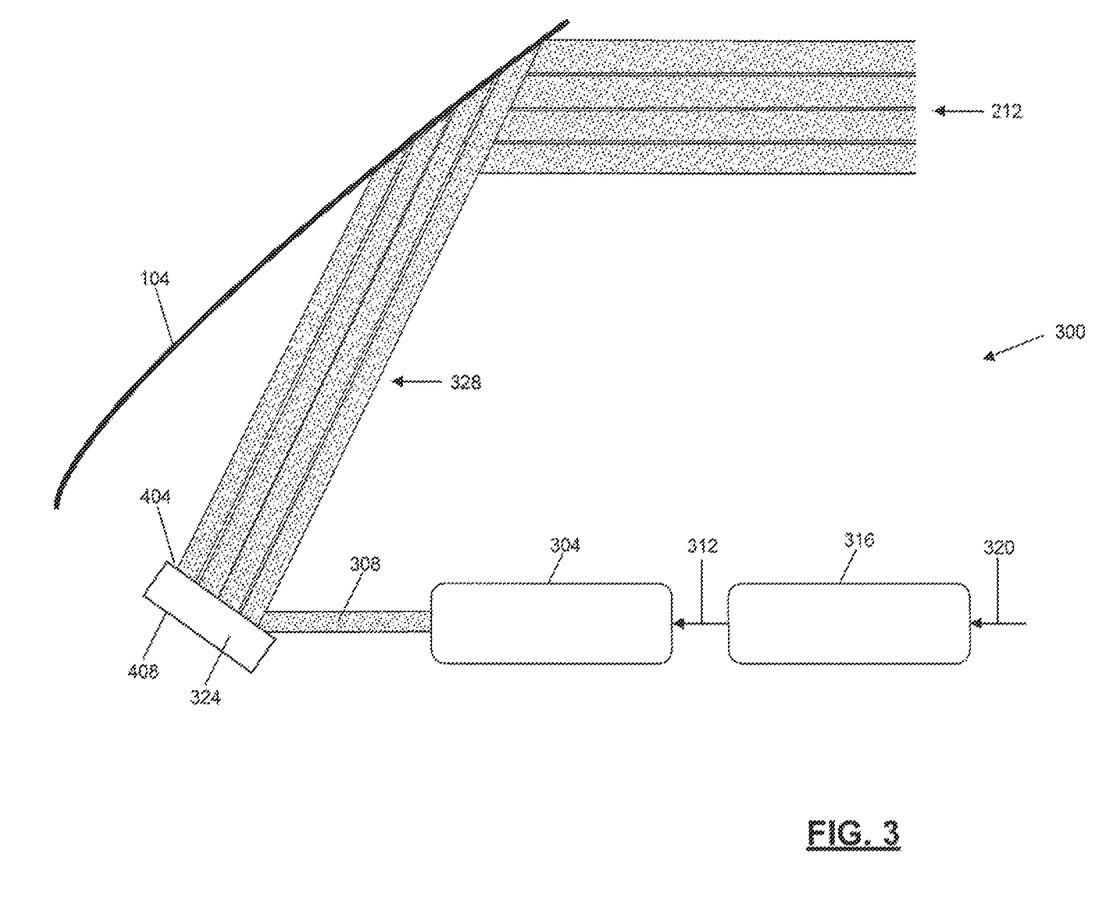
FIG. 3 includes a functional block diagram of an example implementation of a head up display (HUD) system.

FIG. 3 includes an example implementation of the HUD system 300. Light sources and phase modulators 304 are encoded with phase holograms 308 for projection onto the windshield 104 based on signals 312 from a HUD control module 316. For example only, the light sources may include one or more lasers and output red, green, and blue light. The HUD control module 316 generates the signals 312 based on vehicle data 320.

The HUD control module 316 may obtain the vehicle data 320, for example, from a communication bus of the vehicle 100. The vehicle data 320 may include, for example, the present speed of the vehicle 100, the present gear of the transmission of the vehicle 100, the present engine speed, the present directional heading of the vehicle 100, the present infotainment system settings, and/or the other vehicle information.

A replicator 324 replicates the phase hologram 308 N times and outputs the N replicated phase holograms 328 toward the windshield 104 through the aperture 216. N is an integer greater than or equal to 2. By replicating the phase hologram 308 and outputting the N replicated phase holograms 328, the replicator 324 increases the size of the exit pupil (viewing area) of the HUD system 300. The replicator 324 replicates the phase hologram 308 in one direction. In various implementations, the vehicle may include one or more other replicators that may be similar or identical to the replicator 324 that replicate the phase hologram 308 in one or more other directions, respectively. For example, the replicator 324 may replicate the phase hologram 328 in the z direction, and another replicator that is similar or identical to the replicator 324 may replicate the phase hologram 328 in the y direction. For simplicity, the replicator 324 will be described, but the second (other) replicator may be similar or identical to the replicator 324.

A gap between each of the N replicated phase holograms 328 is smaller than a predetermined minimum human pupil size to ensure the continuity of virtual images while the viewer's eyes are moving within the eye box. The predetermined minimum human pupil size may be approximately equal to or equal to 2 millimeters (mm). The gap between each of the N replicated phase holograms 328 satisfies the relationship:

$$0 \text{ mm} \leq \text{gap} \leq \text{predetermined minimum human pupil size (e.g., 2 mm),}$$

where gap is the gap between each of the N replicated phase holograms 328. The hologram 212 includes the N replicated phase holograms 328. The gap satisfying the above relationship ensures that the N replicated phase holograms 328 do not overlap one another. Also, if a pupil is located in the gap between two of the N replicated phase holograms 328, the eye is still able to view part of the hologram and maintain image continuity.

Figure 4:
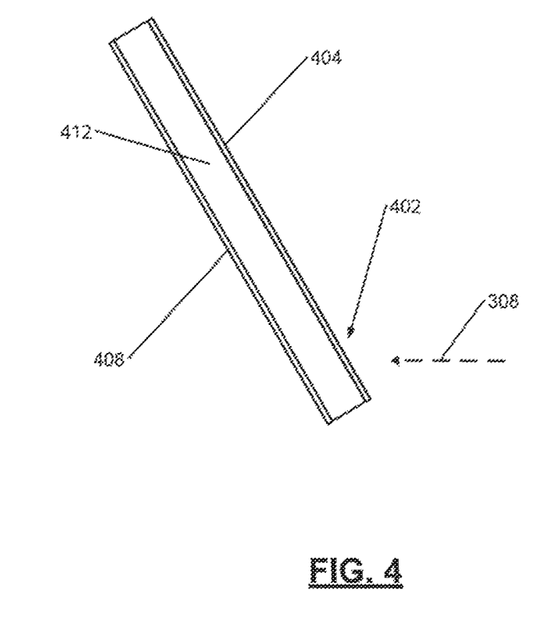
FIG. 4 includes a cross-sectional view of an example implementation of a replicator.

FIG. 4 includes a cross-sectional view of an example implementation of the replicator 324. The replicator 324 includes a transmissive element 404 including a 100 percent transmissive input portion 402, a reflective element 408, and a transparent element 412. The transparent element 412 is disposed between the transmissive element 404 and the reflective element 408. The transparent element 412 may be made of, for example, a glass or a transparent plastic. The transparent element 412 may also be referred to as a wave guide.

The reflective element 408 has a reflectivity of 100 percent. The reflective element 408 may be one or more metallic layers. Alternatively, the reflective layer 408 may be one or more dielectric layers. The reflective element 408 may be applied to the transparent element 412 via an adhesive or applied to the transparent element 412 in another suitable manner.

The transmissive input portion 402 transmits 100% of incident light. The transmissive element 404 includes different transmission at different locations. The transmissive element 404 may be one or more neutral density filters with different regions designed to provide predetermined transmission and reflectivity characteristics. Alternatively, the transmissive element 404 may be one or more dielectric layers with different regions designed to provide predetermined transmission and reflectivity characteristics. Alternatively, the transmissive element 404 may include metallic nanowires (e.g., silver) or metallic nanoparticles (e.g., gold) with different area density to provide predetermined transmission and reflectivity characteristics in different regions, respectively. Alternatively, the transmissive element 404 may be a refractive index mismatched interface (e.g., a photopolymer with controlled degree of polymerization) designed to provide predetermined transmission and reflectivity characteristics at different regions, respectively. The transmissive element 404 may be applied to the transparent element 412 via an adhesive or applied to the transparent element 412 in another suitable manner.

Figure 5:
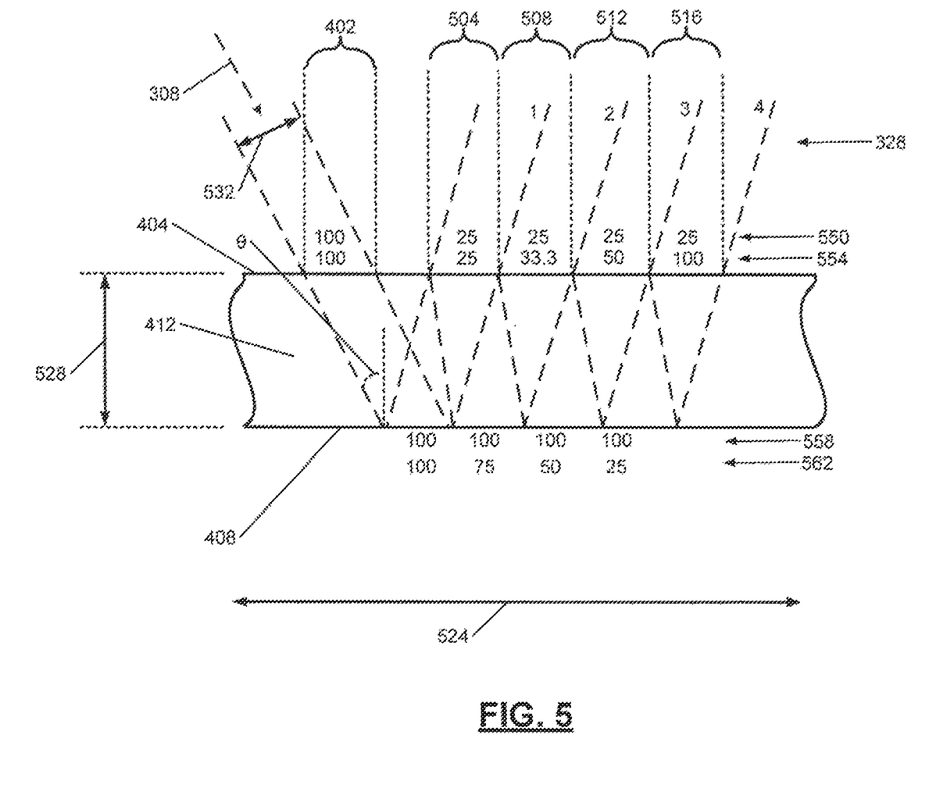
FIG. 5 includes another cross-sectional view of a portion of the replicator.

FIG. 5 includes another cross-sectional view of a portion of the replicator 324. The transmission of the transmissive element 404 may increase moving away from the location where the phase hologram 308 is projected at the replicator 324. For example, the transmissive element 404 may have a first predetermined transmission in a first region 504 where a first one (PH1) of the N replicated phase holograms 328 exits the replicator 324. The first predetermined transmission may be equal to or approximately equal to 25% or another suitable transmission.

The transmissive element 404 may have a second predetermined transmission in a second region 508 where a second one (PH2) of the N replicated phase holograms 328 exits the replicator 324. The second predetermined transmission is greater than the first predetermined transmission. The second predetermined transmission may be equal to or approximately equal to 33% or another suitable transmission.

The transmissive element 404 may have a third predetermined transmission in a third region 512 where a third one (PH3) of the N replicated phase holograms 328 exits the replicator 324. The third predetermined transmission is greater than the second predetermined transmission. The third predetermined transmission may be equal to or approximately equal to 50% or another suitable transmission.

The transmissive element 404 may have a fourth predetermined transmission in a fourth region 516 where a fourth one (PH4) of the N replicated phase holograms 328 exits the replicator 324. The fourth predetermined transmission is greater than the third predetermined transmission. The fourth predetermined transmission (transmittance) may be equal to or approximately equal to 100% or another suitable transmission.

In the above example, N is equal to 4. As stated above, N may be an integer greater than or equal to 2. With the first-fourth predetermined transmissions, the first-fourth ones of the N replicated phase holograms 328 may each have an intensity of 25% of the original phase hologram 308. The transmissions of the different regions may be configured such that the N replicated phase holograms 328 have equal or approximately equal intensities. FIG. 5 includes example intensities 550, transmissions 554, reflectivities 558, and intensities 562. The above may be the same or identical for a second replicator that replicates the phase hologram 308 in a second direction.

The transmissive element 404 has a fifth predetermined transmission in the region 402 where the phase hologram 308 is input to the replicator 324. The fifth predetermined transmission may be equal to or approximately equal to 100% or another suitable transmission.

Lengths 524 of the regions 402 and 504-516 are equal. The reflective element 408 having a reflectivity of 100% reflects all of the received light back toward the transmissive element 404.

A depth (thickness) 528 of the replicator 324 is selected to satisfy the relationship:

$$0 \text{ mm} \leq 2*D*\tan\theta - H \leq \text{predetermined minimum human pupil size (e.g., 2 mm)},$$

where D is the depth 528 of the replicator 324 (e.g., the transparent element 412), tan represents use of the tangent function, H is the length 532 of the phase hologram 308, and θ is the incident angle that the phase hologram 308 is input to the replicator 324.

Figure 6:
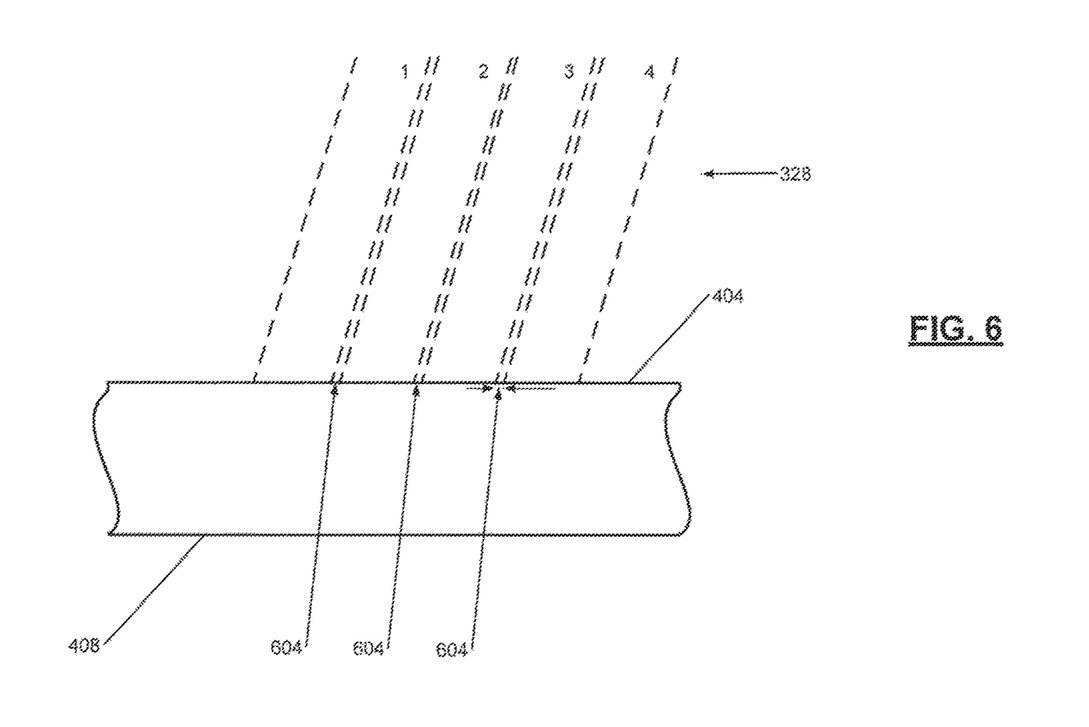
FIG. 6 includes another cross-sectional view of a portion of the replicator illustrating gaps between replicated phase holograms.

FIG. 6 includes another cross-sectional view of a portion of the replicator 324 illustrating gaps 604 between the N replicated phase holograms 328. The gaps 604 may have the same length.

Figure 7:
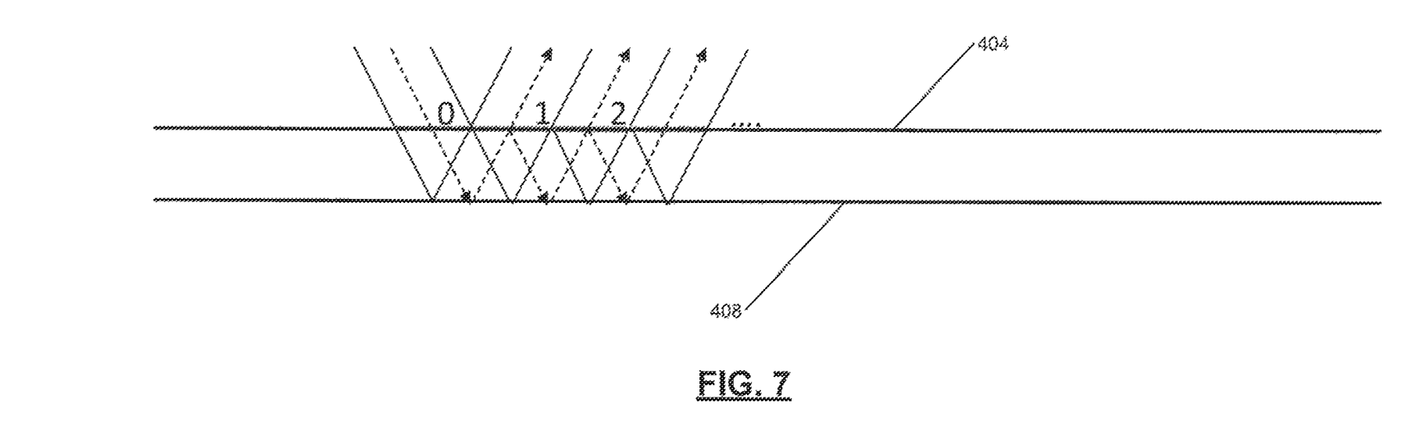
FIG. 7 includes another cross-sectional view of a portion of the replicator.

FIG. 7 includes another cross-sectional view of a portion of the replicator 324. FIG. 7 illustrates that if the phase hologram 308 is replicated N times and has an intensity of I, the intensity of each consecutive one of the N replicator phase holograms 328 decreases by I/N. The transmission of the transmissive element 404 of a region satisfies the relationship:

$$T_i = \frac{\frac{1}{N}}{1 - \frac{i-1}{N}} * 100\%, \text{ and } R_i = 1 - T_i,$$

where $T_i$ is the transmission in a region of the transmissive element 404 for an i-th one of the N replicated phase holograms 328, $R_i$ is the reflectivity in the region for the i-th one of the N replicated phase holograms 328, i is the i-th one of the N replicated phase holograms 328.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

What is claimed is:

1. A head up display (HUD) system comprising: one or more light sources and one or more phase modulators configured to generate and output a hologram;
and a replicator configured to receive the hologram, to generate N replications of the hologram from the hologram, and to output the N replications of the hologram, wherein N is an integer greater than or equal to 2, wherein the replicator includes: a transmissive element configured to receive the hologram and to output the N replications of the hologram; and a reflective element configured to reflect light toward the transmissive element; and a transparent element disposed between the transmissive element and the reflective element, and wherein the transmissive element includes a first region where the hologram is received by the transmissive element and N regions arranged adjacent to the first region where each of the N replications of the hologram are transmitted through the N regions of the transmissive element, respectively, wherein the N regions have N different transmittances, respectively, and wherein values of the N different transmittances increase in non-linear steps in a direction from a first one of the N regions located adjacent to the first region to a last one of the N regions to equalize intensities of the N replications of the hologram transmitted through the transmissive element, wherein the N replications of the hologram do not overlap and gaps between the N replications of the hologram are greater than zero and less than a predetermined minimum diameter of human pupils, and wherein a depth of the replicator satisfies the relationship: $0 \text{ millimeters} < 2*D*\tan\theta - H \leq \text{predetermined minimum human pupil size}$, where D is the depth of the replicator, tan represents use of the tangent function, H is a length of the hologram, θ is an incident angle that the hologram is input to the replicator, and predetermined minimum human pupil size is the predetermined minimum diameter of human pupils.

2. The HUD system of claim 1 wherein the transmissive element includes one or more neutral density filters configured to provide the N different transmittances in the N different regions.

3. The HUD system of claim 1 wherein the transmissive element includes one or more dielectric layers configured to provide the N different transmittances in the N different regions.

4. The HUD system of claim 1 wherein the transmissive element includes metallic nanowires configured to provide the N different transmittances in the N different regions.

5. The HUD system of claim 1 wherein the transmissive element includes metallic nanoparticles configured to provide the N different transmittances in the N different regions.

6. The HUD system of claim 1 wherein the transmissive element includes a refractive index mismatched interface configured to provide the N different transmittances in the N different regions.

7. The HUD system of claim 6 wherein the refractive index mismatched interface includes a photopolymer having controlled degree of polymerization.

8. The HUD system of claim 1 wherein the reflective element has a reflectivity of 100 percent.

9. The HUD system of claim 1 wherein the transparent element includes at least one of:
glass; and
a transparent plastic.

10. The HUD system of claim 1 wherein the replicator is configured to generate and output the N replications of the hologram such that each of the N replications of the hologram has the same intensity.

11. The HUD system of claim 1 wherein the N replications of the hologram are spaced by a gap that is greater than zero and less than 2 millimeters.

12. The HUD system of claim 1 wherein the replicator is configured to output the N replications of the hologram onto a substrate.

13. The HUD system of claim 12 wherein the substrate includes a windshield of a vehicle.

* * * * *